United States Patent
Fu et al.

(10) Patent No.: US 9,484,821 B2
(45) Date of Patent: Nov. 1, 2016

(54) ADJUSTABLE RESONANT APPARATUS FOR POWER CONVERTERS

(71) Applicant: FutureWei Technologies, Inc., Plano, TX (US)

(72) Inventors: Dianbo Fu, Plano, TX (US); Heping Dai, Plano, TX (US); Liming Ye, Frisco, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 52 days.

(21) Appl. No.: 14/071,360

(22) Filed: Nov. 4, 2013

(65) Prior Publication Data

US 2015/0124487 A1 May 7, 2015

(51) Int. Cl.
*H02M 3/335* (2006.01)
*H02M 1/00* (2006.01)

(52) U.S. Cl.
CPC ..... *H02M 3/33507* (2013.01); *H02M 3/33569* (2013.01); *H02M 2001/0058* (2013.01); *Y02B 70/1433* (2013.01); *Y02B 70/1491* (2013.01)

(58) Field of Classification Search
CPC .......... Y02B 70/1433; Y02B 70/1475; Y02B 70/126; Y02B 70/1491; Y02B 20/348; H02M 3/33592; H02M 3/33507; H02M 3/33569; H02M 2001/0058
USPC ............................................ 363/21.01–21.04
See application file for complete search history.

(56) References Cited

U.S. PATENT DOCUMENTS

| | | | | |
|---|---|---|---|---|
| 5,684,678 | A | * | 11/1997 | Barrett .................... H01F 21/08 363/17 |
| 8,107,262 | B2 | * | 1/2012 | Won .................... H02M 3/3376 363/132 |
| 2003/0171109 | A1 | * | 9/2003 | Ballweber ................. H03F 1/56 455/323 |
| 2011/0267844 | A1 | * | 11/2011 | He et al. .................... 363/21.02 |
| 2013/0265804 | A1 | | 10/2013 | Fu et al. | |

FOREIGN PATENT DOCUMENTS

CN 1825743 A 8/2006
CN 101997418 A 3/2011

OTHER PUBLICATIONS

Merriam-Webster Dictionary, Definition of the word "Back to Back" as—coming one after the other.*
International Search Report of Patent Cooperation Treaty (PCT), International Application No. PCT/CN2014/090147, Applicant Huawei Technologies Co., Ltd., date of mailing Jan. 30, 2015, 13 pages.

* cited by examiner

*Primary Examiner* — Adolf Berhane
*Assistant Examiner* — Henry Lee, III
(74) *Attorney, Agent, or Firm* — Slater Matsil, LLP

(57) ABSTRACT

An apparatus comprises a first series resonant inductor coupled to a switching network and a transformer, a first series resonant capacitor coupled to the switching network and the transformer, a first parallel inductor coupled to the switching network through the first series resonant inductor and the first series resonant capacitor, a resonant frequency adjusting device coupled to the switching network and the transformer and a switch connected in series with the resonant frequency adjusting device.

18 Claims, 10 Drawing Sheets

ADJUSTABLE RESONANT APPARATUS FOR POWER CONVERTERS

TECHNICAL FIELD

The present invention relates to a resonant converter, and, in particular embodiments, to a resonant frequency adjusting apparatus for resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which improve the efficiency of an inductor-inductor-capacitor (LLC) resonant power converter.

In accordance with an embodiment, an apparatus comprises a first series resonant inductor coupled to a switching network and a transformer, a first series resonant capacitor coupled to the switching network and the transformer, a first parallel inductor coupled to the switching network through the first series resonant inductor and the first series resonant capacitor, a resonant frequency adjusting device coupled to the switching network and the transformer and a switch connected in series with the resonant frequency adjusting device.

In accordance with another embodiment, a system comprises an input power source, a switching network comprising a first pair of switches coupled between the input power source and a second pair of switches coupled between the input power source, a resonant tank, a rectifier coupled to a secondary side of the transformer and an output filter coupled to the rectifier.

The resonant tank is connected between the switching network and a primary side of a transformer, wherein the resonant tank comprises a first series resonant inductor coupled to the switching network and the transformer, a first series resonant capacitor coupled to the switching network and the transformer, a first parallel inductor coupled to the switching network through the first series resonant inductor and the first series resonant capacitor, a resonant frequency adjusting device coupled to the switching network and the transformer and a switch connected in series with the resonant frequency adjusting device.

In accordance with yet another embodiment, a method comprises providing a resonant tank coupled between a switching network and a transformer, wherein the resonant tank comprises a first series resonant inductor coupled to a switching network and the transformer, a first series resonant capacitor coupled to the switching network and the transformer, a first parallel inductor coupled to the switching network through the first series resonant inductor and the first series resonant capacitor, a resonant frequency adjusting device coupled to the switching network and the transformer and a switch connected in series with the resonant frequency adjusting device.

The method further comprises, in response to a load increase, turning off the switch and configuring the switching network to operate at a first switching frequency approximately equal to a first resonant frequency and, in response to a load drop, turning on the switch and configuring the switching network to operate at a second switching frequency approximately equal to a second resonant frequency.

An advantage of a preferred embodiment of the present invention is improving a power converter's efficiency through adjusting the resonant frequency of the resonant tank of the power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a resonant frequency adjusting apparatus for an inductor-inductor-capacitor (LLC) resonant converter. The invention may also be applied, however, to a variety of resonant converters. Hereinafter, various embodiments will be explained in detail with reference to the accompanying drawings.

Figure 1:
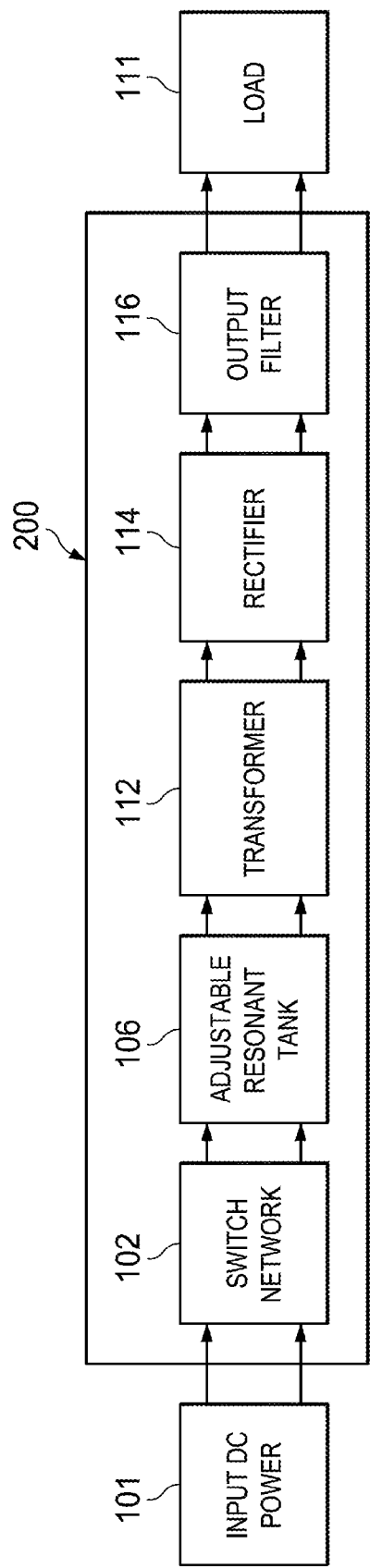
FIG. 1 illustrates a block diagram of an LLC resonant converter in accordance with various embodiments of the present disclosure.

FIG. 1 illustrates a block diagram of an LLC resonant converter in accordance with various embodiments of the present disclosure. The LLC resonant converter 200 is coupled between an input dc power source 101 and a load 111. The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, an adjustable resonant tank 106, a transformer 112, a rectifier 114 and an output filter 116. As shown in FIG. 1, the switch network 102, the adjustable resonant tank 106, the transformer 112, the rectifier 114 and the output filter 116 are coupled to each other and connected in cascade between the input dc power source 101 and the load 111.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

The adjustable resonant tank 106 may be implemented in a variety of ways. For example, the adjustable resonant tank 106 may comprise a main resonant tank and a resonant frequency adjusting apparatus (not shown but illustrated in FIG. 2). The main resonant tank comprises a first series resonant inductor, a first parallel resonant inductor and a first series resonant capacitor (shown in FIG. 2).

The first series resonant inductor and the first parallel resonant inductor may be implemented as external inductors. A person skilled in the art will recognize that there may be many variation, alternatives and modifications. For example, the first series resonant inductor may be implemented as a leakage inductance of the transformer 112.

The resonant element of the resonant frequency adjusting apparatus may be connected in parallel with either the first series resonant inductor or the first series resonant capacitor through a controllable switch. As such, in response to different operating conditions, the resonant frequency of the adjustable resonant tank 106 may be adjustable through the on/off of the controllable switch.

Furthermore, the resonant frequency adjusting apparatus may comprise at least one resonant element (e.g., a capacitor or an inductor). The resonant element is coupled to the main resonant tank through the controllable switch. The resonant element and the controllable switch are connected in series.

In some embodiments, the resonant element may be a capacitor or a plurality of capacitors connected in parallel and/or in series. The capacitor is connected in parallel with the first series resonant capacitor through the switch. By turning on or off the switch, the effective capacitance of the adjustable resonant tank 106 may vary accordingly. Likewise, the resonant element may be an inductor or a plurality of inductors connected in parallel and/or in series. As such, the resonant frequency of the adjustable resonant tank 106 may vary by turning on/off the switch.

In sum, the adjustable resonant tank 106 includes three key resonant elements, namely the first series resonant inductor, the first series resonant capacitor and the parallel resonant inductor. Such a configuration is commonly referred to as an LLC resonant converter. According to the operating principle of LLC resonant converters, at a switching frequency approximately equal to the resonant frequency of the adjustable resonant tank 106, the adjustable resonant tank 106 helps to achieve zero voltage switching for the primary side switching elements and zero current switching for the secondary side switching elements.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
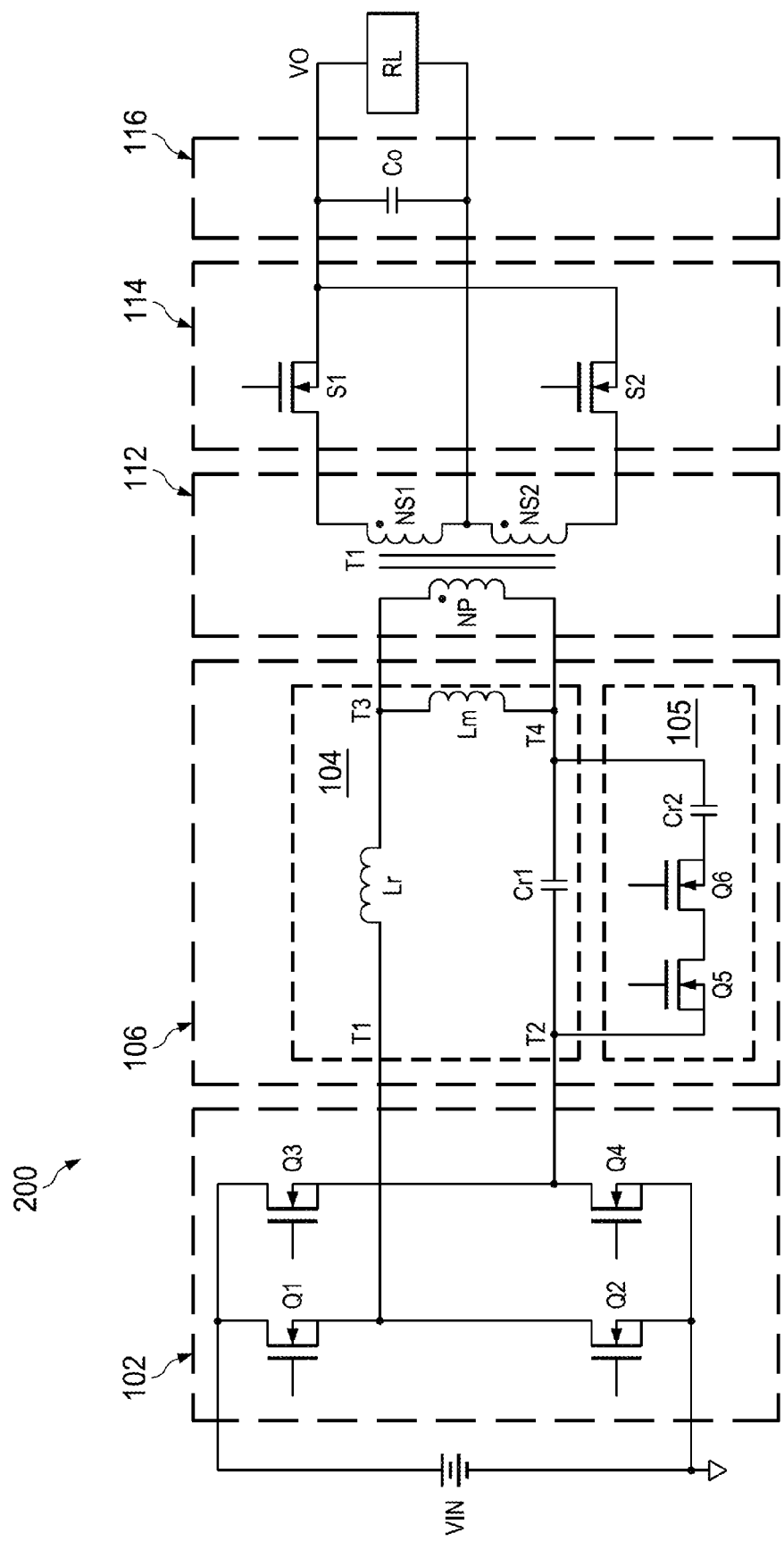
FIG. 2 illustrates a schematic diagram of the LLC resonant converter shown in FIG. 1 in accordance with various embodiments of the present disclosure.

FIG. 2 illustrates a schematic diagram of the LLC resonant converter shown in FIG. 1 in accordance with various embodiments of the present disclosure. The switch network 102 includes four switching elements, namely Q1, Q2, Q3 and Q4. As shown in FIG. 2, a first pair of switching elements Q1 and Q2 are connected in series. A second pair of switching elements Q3 and Q4 are connected in series. The common node of the switching elements Q1 and Q2 is coupled to a first input terminal T1 of the adjustable resonant tank 106 Likewise, the common node of the switching elements Q3 and Q4 is coupled to a second input terminal T2 of the adjustable resonant tank 106.

The switching elements Q1, Q2, Q3 and Q4 form a primary side switching network of a full bridge resonant converter. According to some embodiments, switching elements Q1, Q2, Q3 and Q4 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q1, Q2, Q3, and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

FIG. 2 further illustrates the adjustable resonant tank 106 includes a main resonant tank 104 and a resonant frequency adjusting apparatus 105. The main resonant tank 104 is formed by a first series resonant inductor Lr, a first series resonant capacitor Cr1 and a first parallel inductance Lm. As shown in FIG. 2, the first resonant inductor Lr and the first resonant capacitor Cr1 are connected in series and further coupled to the primary side of the transformer 112.

The resonant frequency adjusting apparatus 105 comprises a second series resonant capacitor Cr2 and two back-to-back connected metal oxide semiconductor (MOS) transistors Q5 and Q6. The second series resonant capacitor Cr2 and transistors Q5 and Q6 form a resonant frequency adjusting circuit, which is connected in parallel with the first series resonant capacitor Cr1.

The resonant frequency adjusting apparatus 105 may be utilized in combination with Lr and Cr to achieve zero voltage switching for the primary side switching elements (e.g., Q1) and zero current switching for the secondary side switching elements (e.g., S1). In some embodiments, under a full or heavy load, the LLC resonant converter 200 may operate at a first frequency approximately equal to 1 MHz. On the other hand, under a light load, the LLC resonant converter 200 may operate at a second frequency approximately equal to 500 KHz. Such a lower switching frequency at a light load may help to reduce the switching losses of the LLC resonant converter 200.

In order to achieve zero voltage switching and/or zero current switching, the resonant frequency of the LLC resonant converter 200 may vary in response to the change of the switching frequency. More particularly, in response to a load increase such as the load level greater than a predetermined load threshold, the LLC resonant converter 200 may operate at a first switching frequency (e.g., 1 MHz). At the same time, the transistors Q5 and Q6 are turned off. As a result, the effective capacitance of the adjustable resonant tank 106 is reduced. Such a reduced capacitance helps to increase the resonant frequency of the adjustable resonant tank 106 to a level approximately equal to the first switching frequency.

Likewise, in response to a load drop, such as the load level less than the predetermined load threshold, the LLC resonant converter 200 may operate at a second switching frequency (e.g., 500 KHz). At the same time, the transistors Q5 and Q6 are turned on. As a result, the effective capacitance of the adjustable resonant tank 106 is increased. Such an increased capacitance helps to reduce the resonant frequency of the adjustable resonant tank 106 to a level approximately equal to the second switching frequency.

One advantageous feature of the LLC resonant converter 200 shown in FIG. 2 is that the LLC resonant converter 200 may operate at a frequency close to the resonant frequency of the adjustable resonant tank 106. As such, the LLC resonant converter 200 can achieve zero voltage switching for the primary side switches and zero current switching for the secondary side switches. The soft switching operation of the primary and secondary switches helps to achieve high efficiency.

It should be noted while FIG. 2 shows the first series resonant inductor Lr is an independent component, the first series resonant inductor Lr may be replaced by the leakage inductance of the transformer 112. In other words, the leakage inductance (not shown) may function as the first series resonant inductor Lr.

The transformer 112 may be of a primary winding and a center tapped secondary winding. The primary winding is coupled to terminals T3 and T4 of the adjustable resonant tank 106 as shown in FIG. 2. The secondary winding is coupled to the load 111 through the rectifier 114, which is formed by switches S1 and S2.

It should be noted the transformer structure shown in FIG. 2 is merely an example. One person skilled in the art will recognize many alternatives, variations and modification. For example, the secondary side of the transformer 112 may be a single winding. As a result, the secondary side may employ a synchronous rectifier formed by four switching elements (a.k.a. full wave rectifier). The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

Figure 3:
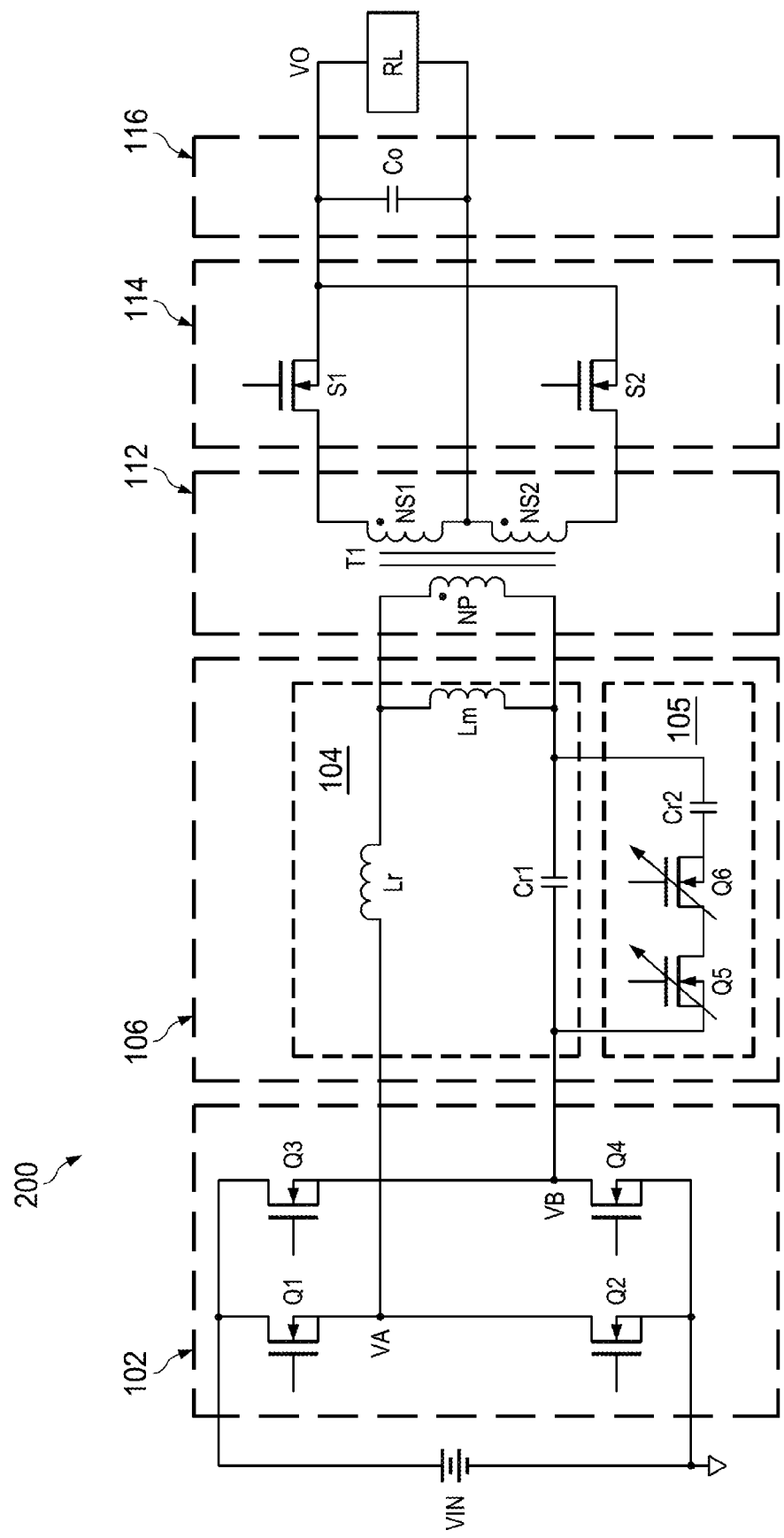
FIG. 3 illustrates a first illustrative operating mode of the LLC resonant converter shown in FIG. 2 in accordance with various embodiments of the present disclosure.

FIG. 3 illustrates a first illustrative operating mode of the LLC resonant converter shown in FIG. 2 in accordance with various embodiments of the present disclosure. The LLC resonant converter 200 operates under a full load condition or a heavy load condition. The definition of a heavy load condition is based upon different applications and design needs. For example, in some embodiments, a load level greater than 50% of the full load is defined as a heavy load.

In FIG. 3, the black arrows placed on top of the components (e.g., Q5) of FIG. 3 indicate such components are disabled when the LLC resonant converter 200 operates at the heavy load condition. As shown in FIGS. 3, Q5 and Q6 are disabled. As a result, the second series resonant capacitor Cr2 is not connected in parallel with the first series resonant capacitor Cr1. In other words, Cr2 does not contribute to the resonant frequency of the adjustable resonant tank 106.

Figure 4:
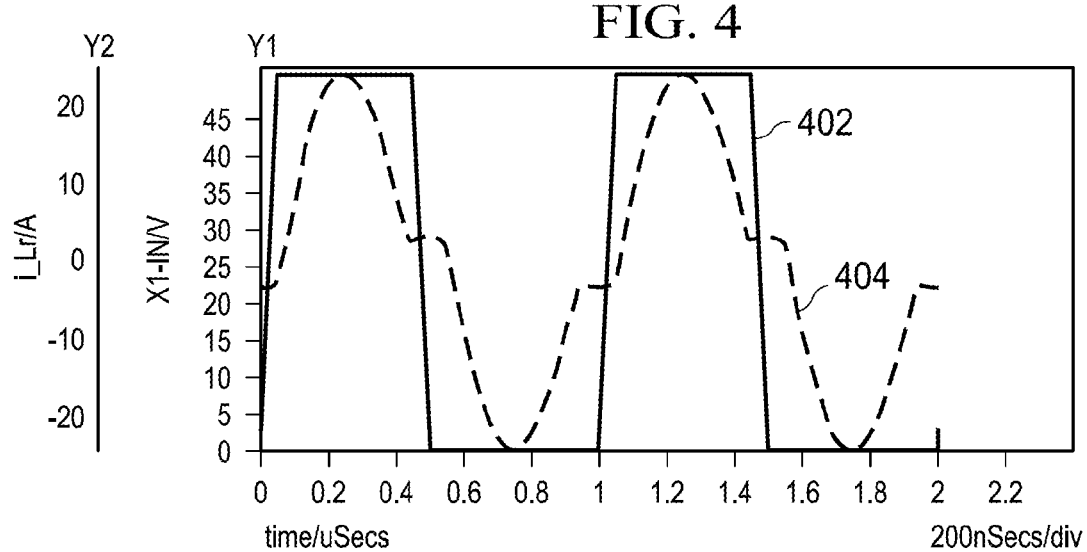
FIG. 4 illustrates key switching waveforms of the LLC resonant converter shown in FIG. 3 in accordance with various embodiments of the present disclosure.

FIG. 4 illustrates key switching waveforms of the LLC resonant converter shown in FIG. 3 in accordance with various embodiments of the present disclosure. The horizontal axis of FIG. 4 represents intervals of time. The unit of the horizontal axis is micro second. There may be two vertical axes. The first vertical axis Y1 represents the voltage across the input of the adjustable resonant tank 106. The second vertical axis Y2 represents the current flowing from the first series resonant inductor Lr.

The switching waveform 402 illustrates the voltage across node VA and node VB. The waveform 404 shows the current flowing through the first series resonant inductor Lr. The waveforms 402 and 404 indicate the LLC resonant converter 200 may achieve zero voltage switching as well as zero current switching.

Figure 5:
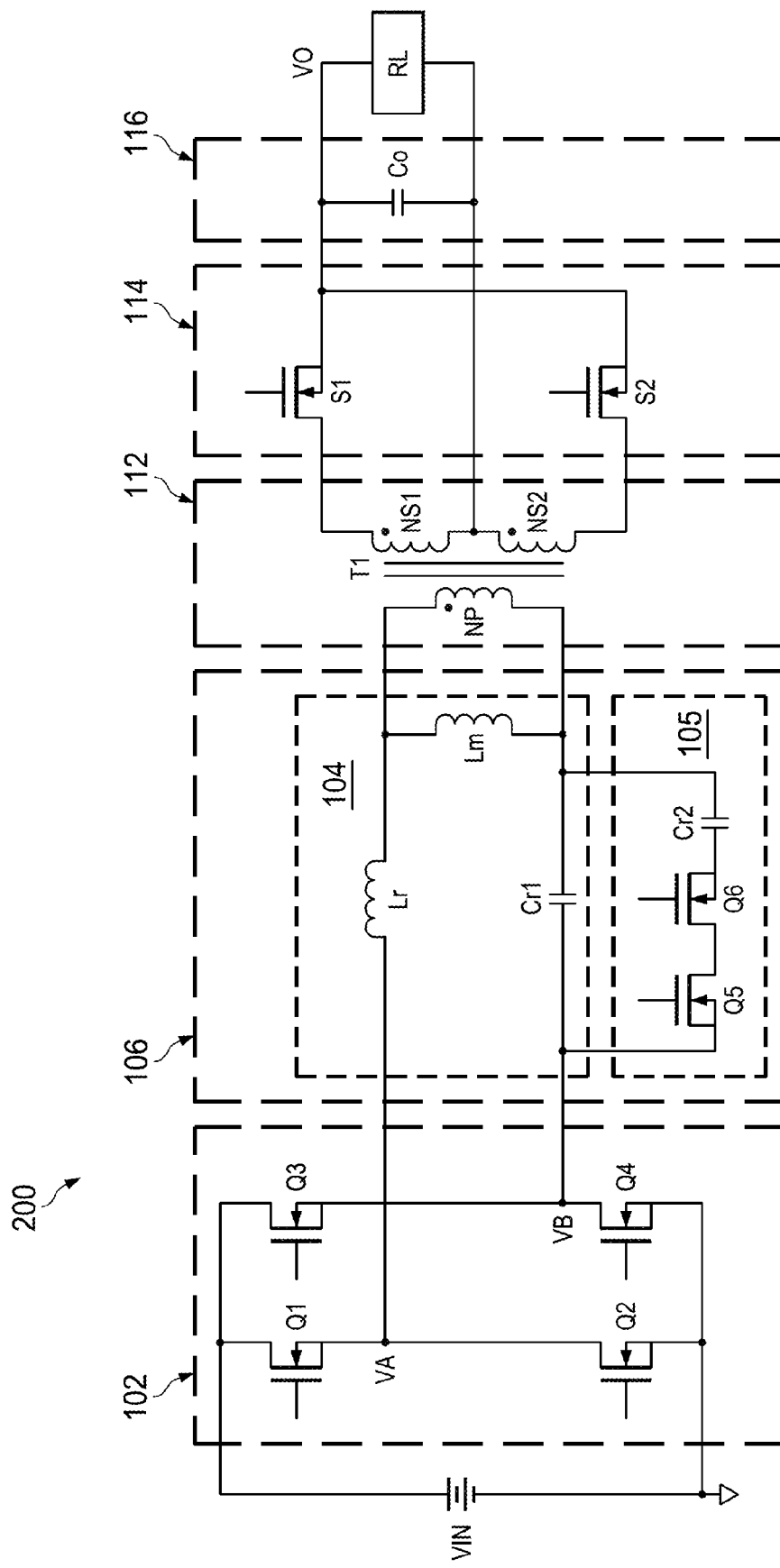
FIG. 5 illustrates a second illustrative operating mode of the LLC resonant converter shown in FIG. 2 in accordance with various embodiments of the present disclosure.

FIG. 5 illustrates a second illustrative operating mode of the LLC resonant converter shown in FIG. 2 in accordance with various embodiments of the present disclosure. The LLC resonant converter 200 operates under a light load condition. The definition of a light load condition is based upon different applications and design needs. For example, in some embodiments, a load level less than or equal to 50% of the full load is defined as the light load condition.

As shown in FIG. 5, both transistor Q5 and Q6 are turned on in response to the light load condition. It should be noted that it is not necessary to turn both Q5 and Q6. In order to reduce the switching losses, only one switch (e.g., Q5) may be turned on. The turned on transistor Q5 and the body diode of the transistor Q6 may form a conductive path so that the second series resonant capacitor Cr2 and the first series resonant capacitor Cr1 are connected in parallel.

In comparison with the system configuration shown in FIG. 3, the second series resonant capacitor Cr2 is connected in parallel with the first series resonant capacitor Cr1. The parallel-connected capacitors Cr1 and Cr2 help to reduce the resonant frequency of the adjustable resonant tank 106.

Figure 6:
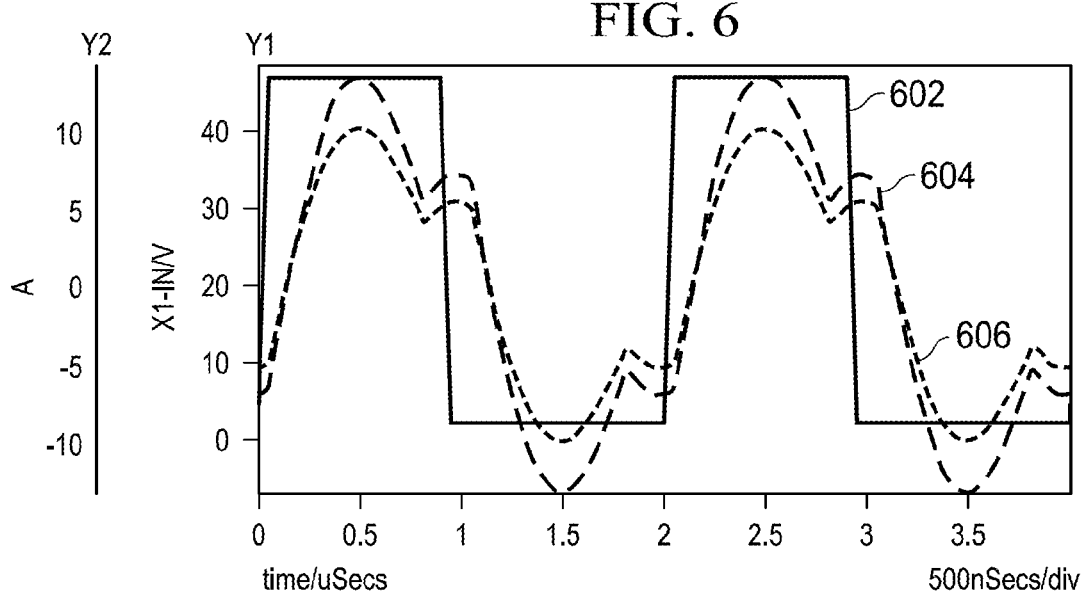
FIG. 6 illustrates key switching waveforms of the LLC resonant converter shown in FIG. 5 in accordance with various embodiments of the present disclosure.

FIG. 6 illustrates key switching waveforms of the LLC resonant converter shown in FIG. 5 in accordance with various embodiments of the present disclosure. The horizontal axis of FIG. 6 represents intervals of time. The unit of the horizontal axis is micro second. There may be two vertical axes. The first vertical axis Y1 represents the voltage across the input of the adjustable resonant tank 106. The second vertical axis Y2 represents the current flowing from the first series resonant inductor Lr.

The switching waveform 602 illustrates the voltage across node VA and node VB. The waveform 604 shows the current flowing through the first series resonant inductor Lr. The waveform 606 shows the current flowing through the second series resonant capacitor Cr2. The waveforms 602, 604 and 606 indicate the LLC resonant converter 200 may achieve zero voltage switching as well as zero current switching.

Figure 7:
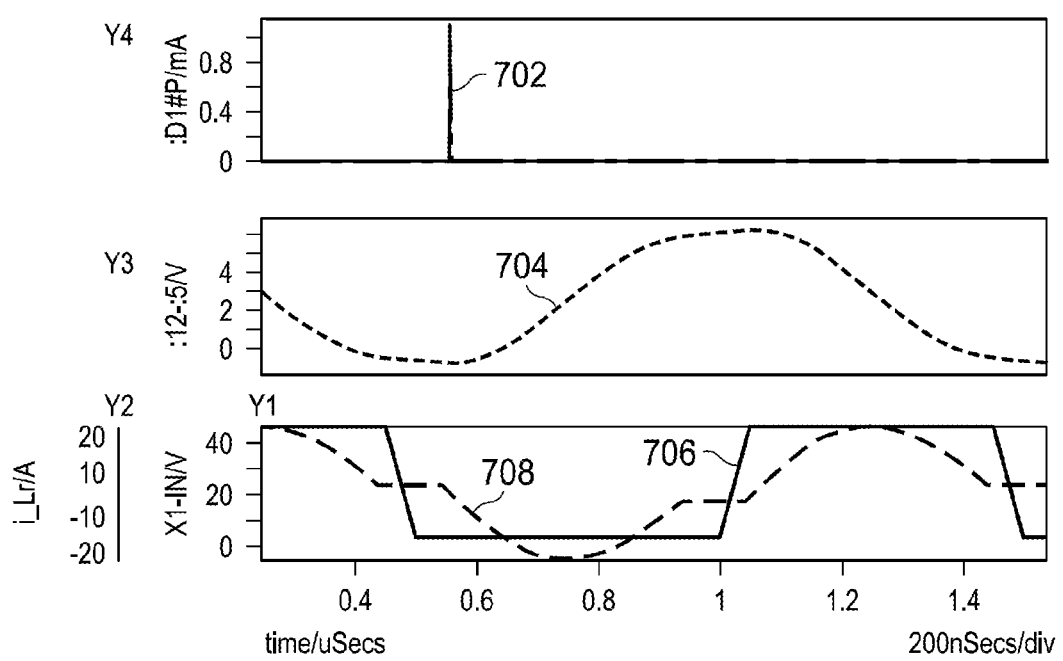
FIG. 7 illustrates key switching waveforms of the resonant frequency adjusting device shown in FIG. 5 in accordance with various embodiments of the present disclosure.

FIG. 7 illustrates key switching waveforms of the resonant frequency adjusting device shown in FIG. 5 in accordance with various embodiments of the present disclosure. The horizontal axis of FIG. 7 represents intervals of time. The unit of the horizontal axis is micro second. There may be four vertical axes. The first vertical axis Y1 represents the voltage across the input of the adjustable resonant tank 106. The second vertical axis Y2 represents the current flowing from the first series resonant inductor Lr. The third vertical axis Y3 represents the voltage across the drain and the source of the transistor Q5. The fourth vertical axis Y4 represents the current flowing through the transistor Q5.

The waveform 702 shows the current flowing through the transistor Q5. The waveform 704 shows the voltage across the drain and the source of the transistor Q5. The waveform 706 shows the voltage across the node VA and the node VB. The waveform 708 shows the current flowing through the first series resonant inductor Lr.

As shown in FIG. 7, the waveform 704 and the waveform 702 show the transistor Q5 may achieve zero voltage switching. In addition, the transition of the transistor Q5 is in sync with the transistor of the main switches (e.g., Q1). Furthermore, the voltage stress of the transistors Q5 and Q5 is about 6 V according to some embodiments. The transistors Q5 and Q6 may be driven through suitable drivers such as a bootstrap circuit and/or the like.

Figure 8:
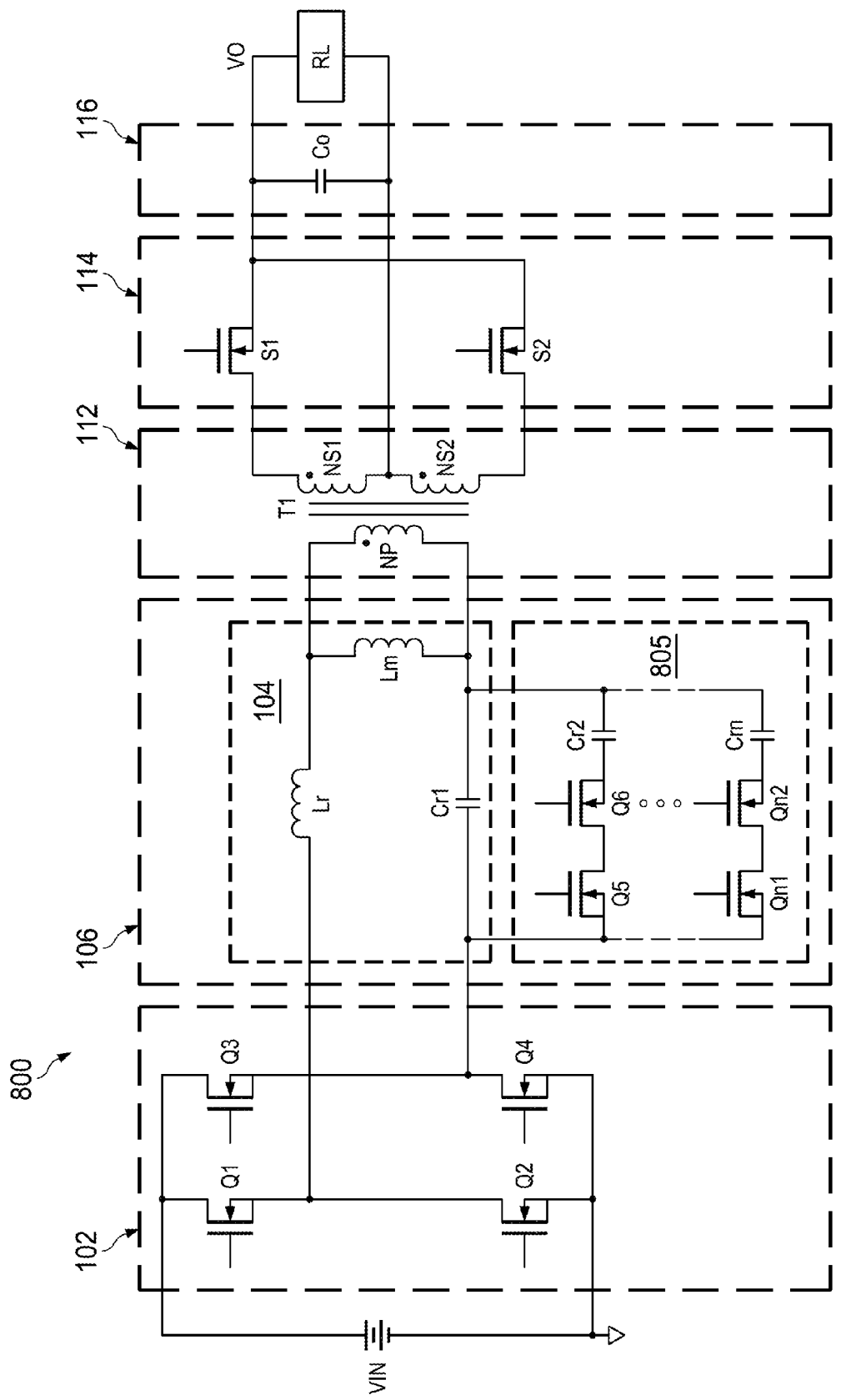
FIG. 8 illustrates another schematic diagram of the LLC resonant converter shown in FIG. 1 in accordance with various embodiments of the present disclosure.

FIG. 8 illustrates another schematic diagram of the LLC resonant converter shown in FIG. 1 in accordance with various embodiments of the present disclosure. The schematic diagram is similar to that shown in FIG. 2 except that the resonant frequency adjusting device 805 may comprise a plurality of capacitors and their respective switches. A plurality of switches such as Qn1 and Qn2 are connected in series with the plurality of capacitors such as Crn. By controlling the on/off state of these switches, in response to different operating conditions, a variety of capacitances can be obtained.

In sum, the resonant frequency adjusting device can be implemented as a discrete set of finite capacitance variations as shown in FIG. 2. On the other hand, the resonant frequency adjusting device may be generalized to have multiple states as shown in FIG. 8. The diagram shown in FIG. 8 is merely an example. A person skilled in the art will recognize there may be many alternatives, modifications and variations.

Figure 9:
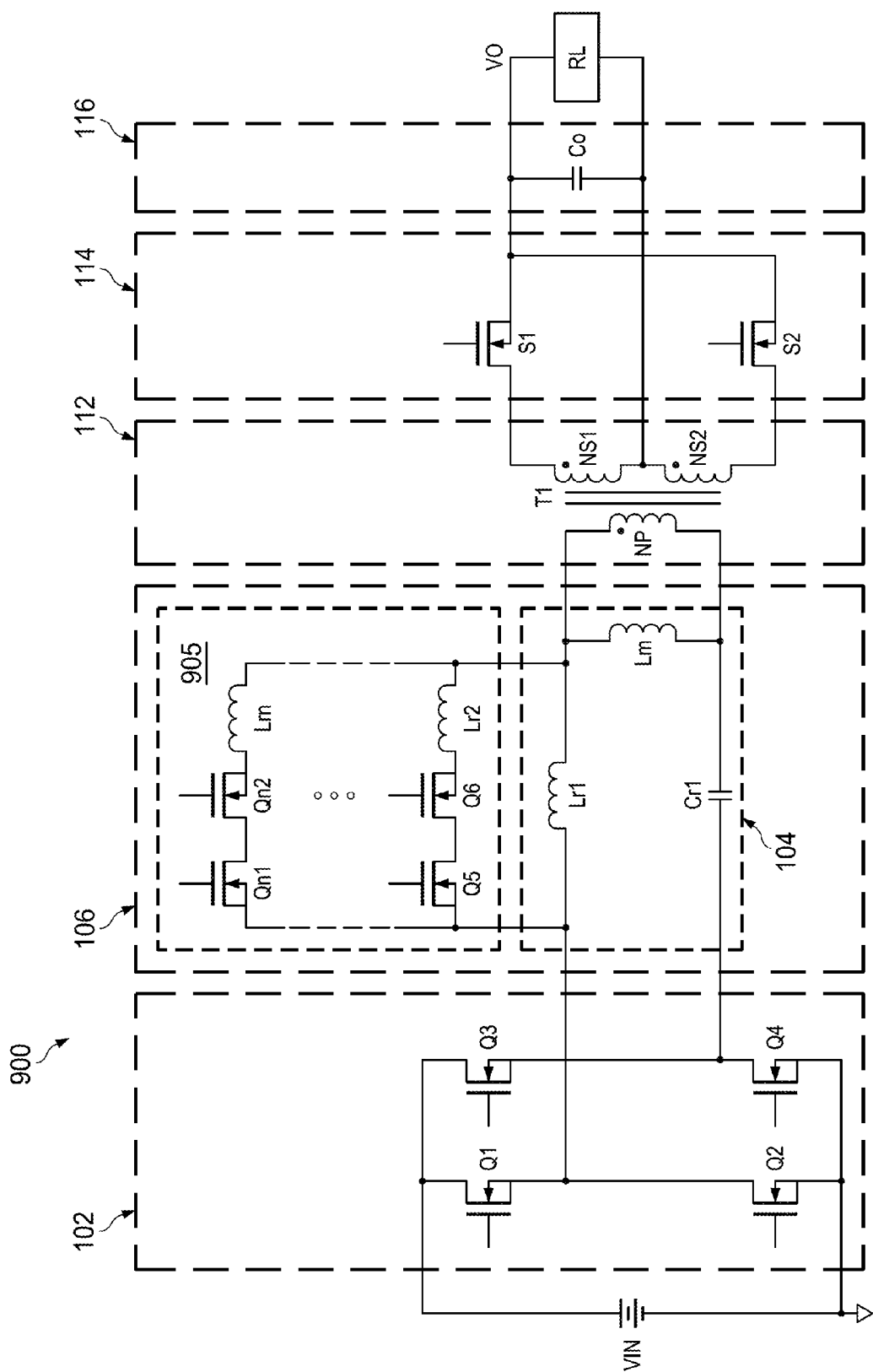
FIG. 9 illustrates yet another schematic diagram of the LLC resonant converter shown in FIG. 1 in accordance with various embodiments of the present disclosure.

FIG. 9 illustrates yet another schematic diagram of the LLC resonant converter shown in FIG. 1 in accordance with various embodiments of the present disclosure. The schematic diagram is similar to that shown in FIG. 8 except that the resonant frequency adjusting device 905 may comprise a plurality of inductors and their respective switches. A plurality of switches such as Qn1 and Qn2 are connected in series with the plurality of inductors such as Lrn. By controlling the on/off state of these switches, a variety of inductances can be obtained.

Figure 10:
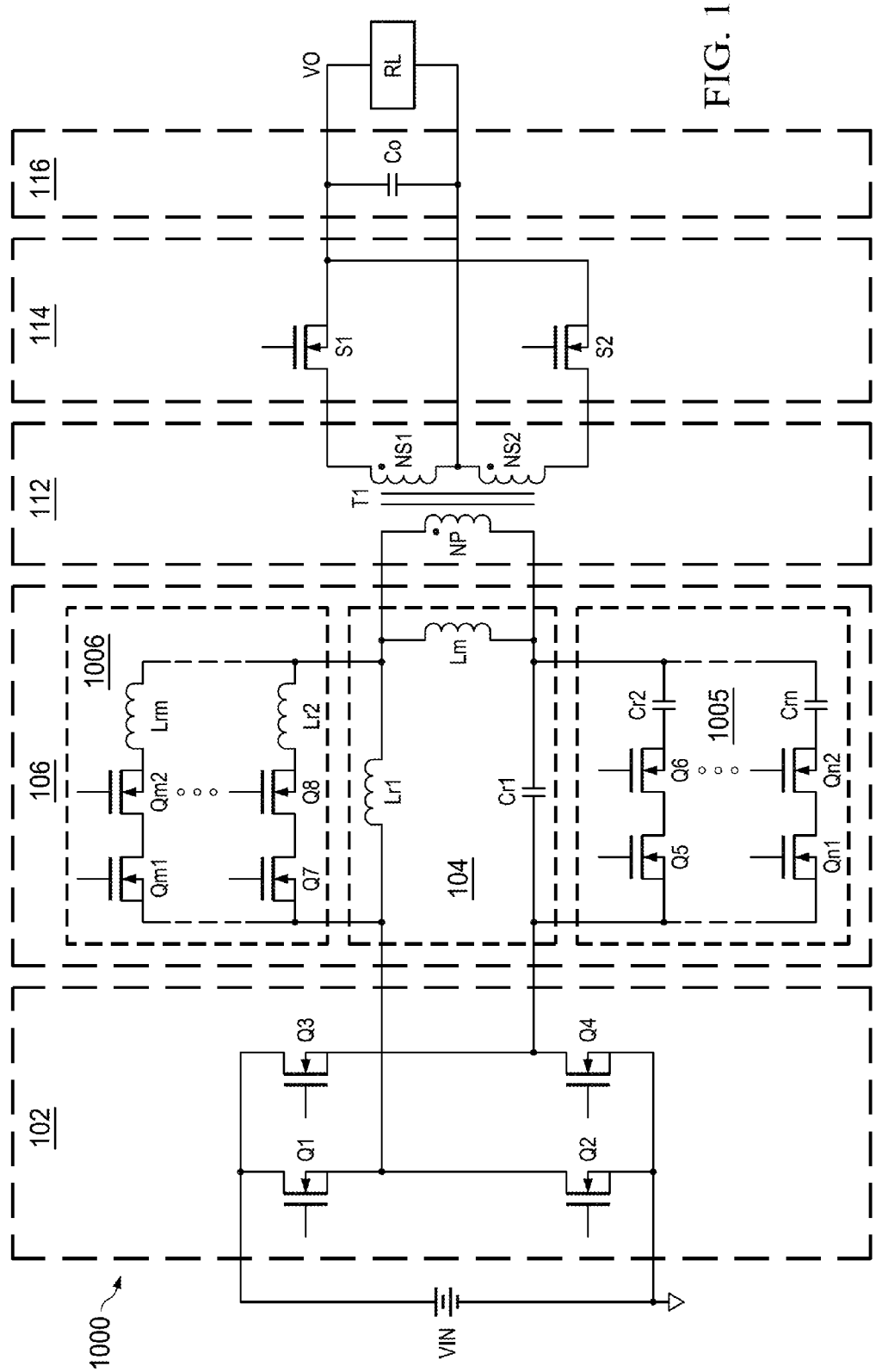
FIG. 10 illustrates yet another schematic diagram of the LLC resonant converter shown in FIG. 1 in accordance with various embodiments of the present disclosure.

FIG. 10 illustrates yet another schematic diagram of the LLC resonant converter shown in FIG. 1 in accordance with various embodiments of the present disclosure. The schematic diagram (e.g., resonant frequency adjusting apparatus 1005 and resonant frequency adjusting apparatus 1006) shown in FIG. 10 is a combination of the resonant frequency adjusting mechanism shown in FIG. 8 and the resonant frequency adjusting mechanism shown in FIG. 9, and hence is not discussed herein to avoid repetition.

Figure 11:
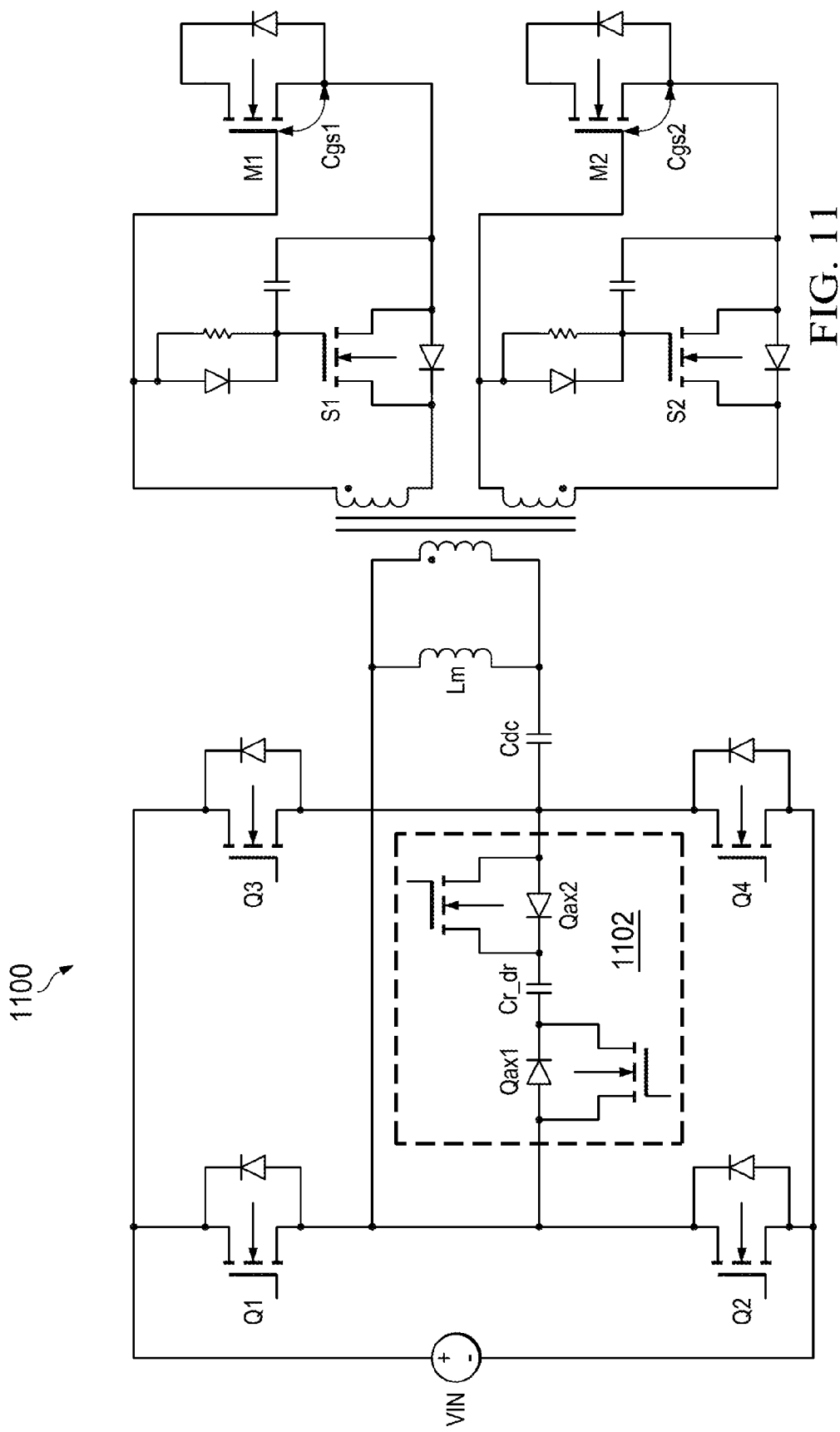
FIG. 11 illustrates another resonant frequency adjusting device in accordance with various embodiments of the present disclosure.

FIG. 11 illustrates another resonant frequency adjusting device in accordance with various embodiments of the present disclosure. A lossless gate driver 1100 is illustrated in FIG. 11 according to some embodiments. The lossless gate driver 1100 generates two gate drive signals, which are used to drive switching elements M1 and M2 respectively.

In some embodiments, M1 and M2 may be MOSFET transistors. As shown in FIG. 11, the switching element M1 has a gate-to-source capacitance Cgs1. Likewise, the switching element M2 has a gate-to-source capacitance Cgs2. During a lossless gate drive process, Cgs1, Cgs2 and Lm may form a resonant process. The resonance between Lm and the gate-to-source capacitance (e.g., Cgs1) helps to reduce the energy dissipated during the gate drive process. The operating principle of lossless gate drive circuits is well known, and hence is not discussed in further detail herein.

The primary side of the lossless gate drive circuit 1100 includes a bridge formed by Q1, Q2, Q3 and Q4, a dc blocking capacitor Cdc and a resonant frequency adjusting apparatus 1102. The resonant frequency adjusting apparatus 1102 includes a capacitor Cr_dr and two switches Qax1 and Qax2. Switches Qax1 and Qax2 are back-to-back connected. Qax1 and Qax2 may be implemented as MOSFET transistors.

In operation, when a higher resonant frequency is desirable, Qax1 and Qax2 are turned off. As a result, Lm, Cgs1 and Cgs2 form a resonant process. The resonant frequency of the resonant process is in a range from about 1 MHz to about 10 MHz. On the other hand, when a lower resonant frequency is desirable, Qax1 and Qax2 are turned on. Consequently, Cr_dr contributes the resonant process of Lm, Cgs1 and Cgs2. The resonant frequency of the resonant process is in a range from about 100 KHz to about 1 MHz.

One advantageous feature of having the resonant frequency adjusting apparatus 1102 is that the resonant frequency of a lossless gate drive circuit is adjustable based upon the operation of the main transistors (e.g., switching elements M1 and M2). In operation, the switching frequency of the main switches such as M1 and M2 may vary depending on different operating conditions. The resonant frequency adjusting apparatus 1102 provides a mechanism to force the resonant frequency of the lossless gate drive circuit 1100 approximately equal to the switching frequency.

It should be noted that the dc blocking capacitor Cdc is at least ten times greater than Cr_dr. In some embodiments, Cdc is about 200 uF. Cr_dr is about 200 nF.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a first series resonant inductor coupled to a switching network and a transformer;
a first series resonant capacitor coupled to the switching network and the transformer;
a first parallel inductor coupled to the switching network through the first series resonant inductor and the first series resonant capacitor;
a resonant frequency adjusting device coupled to the switching network and the transformer; and
a switch connected in series with the resonant frequency adjusting device, wherein the switch is formed by two back-to-back connected transistors, and wherein the switch has a first terminal directly connected with the resonant frequency adjusting device and a second terminal directly connected with the switching network, and wherein the switch comprises a first transistor and a second transistor that are turned off when a load of the apparatus is greater than a predetermined threshold and turned on when the load of the apparatus is less than the predetermined threshold.

2. The apparatus of claim 1, wherein:
the resonant frequency adjusting device is a capacitor.

3. The apparatus of claim 2, wherein:
the switch and the capacitor form a second series resonant capacitor; and
the second series resonant capacitor and the first series resonant capacitor are connected in parallel.

4. The apparatus of claim 1, wherein:
the resonant frequency adjusting device is an inductor.

5. The apparatus of claim 4, wherein:
the switch and the inductor form a second series resonant inductor; and
the second series resonant inductor and the first series resonant inductor are connected in parallel.

6. The apparatus of claim 1, wherein:
the first parallel inductor is implemented as a magnetizing inductance of the transformer.

7. The apparatus of claim 1, wherein:
the first parallel inductor is implemented as a separate inductor coupled between a primary side winding of the transformer.

8. A system comprising:
an input power source;
a switching network comprising:
  a first pair of switches coupled between the input power source; and
  a second pair of switches coupled between the input power source;
a resonant tank connected between the switching network and a primary side of a transformer, wherein the resonant tank comprises:
  a first series resonant inductor coupled to the switching network and the transformer;
  a first series resonant capacitor coupled to the switching network and the transformer;
  a first parallel inductor coupled to the switching network through the first series resonant inductor and the first series resonant capacitor;
  a resonant frequency adjusting device coupled to the switching network and the transformer; and
  a switch connected in series with the resonant frequency adjusting device, wherein the switch has a first terminal directly connected with the resonant frequency adjusting device and a second terminal directly connected with a common node of the switches of the switching network, and wherein the switch comprises a first transistor and a second transistor back-to-back connected, and wherein the first transistor and the second transistor are configured such that:
    both the first transistor and the second transistor are turned off when a load of the system is greater than a predetermined threshold; and
    at least one transistor of the first transistor and the second transistor is turned on when the load of the system is less than the predetermined threshold;
a rectifier coupled to a secondary side of the transformer; and
an output filter coupled to the rectifier.

9. The system of claim 8, wherein:
the switching network, the resonant tank, the transformer, the rectifier and the output filter form an LLC resonant converter.

10. The system of claim 9, wherein the switch is configured such that:
the LLC resonant converter is of a first resonant frequency when the switch is turned on; and
the LLC resonant converter is of a second resonant frequency when the switch is turned off.

11. The system of claim 8, wherein:
the switch is formed by two back-to-back connected metal oxide semiconductor transistors.

12. The system of claim 8, wherein:
the transformer is a center-tapped transformer; and
the rectifier is a synchronous rectifier.

13. The system of claim 8, wherein:
the transformer is a non center-tapped transformer; and
the rectifier is a full-wave rectifier.

14. A method comprising:
providing a resonant tank coupled between a switching network and a transformer, wherein the resonant tank comprises:
  a first series resonant inductor coupled to a switching network and the transformer;
  a first series resonant capacitor coupled to the switching network and the transformer;
  a first parallel inductor coupled to the switching network through the first series resonant inductor and the first series resonant capacitor;
  a resonant frequency adjusting device coupled to the switching network and the transformer; and
  a switch connected in series with the resonant frequency adjusting device, wherein the switch comprises a first transistor and a second transistor back-to-back connected in series;
in response to a load increase, turning off both the first transistor and the second transistor and configuring the switching network to operate at a first switching frequency approximately equal to a first resonant frequency; and
in response to a load drop, turning on the first transistor, keeping the second transistor off and configuring the switching network to operate at a second switching frequency approximately equal to a second resonant frequency.

15. The method of claim 14, further comprising:
detecting a load current flowing through the switching network;
comparing the load current with a predetermined load threshold;
turning on the switch when the load current is less than the predetermined load threshold; and
turning off the switch when the load current is greater than the predetermined load threshold.

16. The method of claim 15, wherein:
the predetermined load threshold is about 50% of a full load of the switching network.

17. The method of claim 14, wherein:
the resonant frequency adjusting device is a capacitor, wherein the capacitor and the first series resonant capacitor are connected in parallel through the switch.

18. The method of claim 14, further comprising:
coupling the switching network to a dc input power source;
coupling a primary side of a converter and a secondary side of the converter through the transformer providing isolation between the primary side and the secondary side of the converter;
coupling a rectifier to the secondary side; and
coupling an output filter to the rectifier.

* * * * *